United States Patent [19]

Katahira

[11] Patent Number: 5,303,607
[45] Date of Patent: Apr. 19, 1994

[54] BALL SCREW DEVICE

[75] Inventor: Masayuki Katahira, Maebashi, Japan

[73] Assignee: NSK Ltd., Tokyo, Japan

[21] Appl. No.: 988,316

[22] Filed: Dec. 9, 1992

[30] Foreign Application Priority Data

Dec. 13, 1991 [JP] Japan .................. 3-109966[U]

[51] Int. Cl.$^5$ ............................................. F16H 55/17
[52] U.S. Cl. .................................. 74/459; 74/424.8 R
[58] Field of Search .................... 74/424.8 R, 459

[56] References Cited

U.S. PATENT DOCUMENTS

| 2,380,662 | 7/1945 | Means, Jr. | 74/459 |
| 2,756,608 | 7/1956 | Greenough | 74/459 |

FOREIGN PATENT DOCUMENTS

| 2102357 | 9/1971 | Fed. Rep. of Germany | 74/459 |
| 1241584 | 8/1960 | France | 74/459 |
| 57-83752 | 5/1982 | Japan | 74/459 |
| 1581941 | 7/1990 | U.S.S.R. | 74/459 |

*Primary Examiner*—Leslie A. Braun
*Assistant Examiner*—David W. Laub
*Attorney, Agent, or Firm*—Oblon, Spivak, McClelland, Maier & Neustadt

[57] ABSTRACT

A ball screw device includes a ball returning tube which is formed by covering the outer periphery of the tube with a heat shrinkable resin tube and heating the thus formed tube, formed of two halves, to shrink the heat shrinkable resin tube so that the two halves of the ball returning tube can be made integral. The ball screw device is advantageous in that it generates little noise, the ball returning tube has sufficient strength despite the splittable structure and manufacturing of the device is easy.

5 Claims, 4 Drawing Sheets

BALL SCREW DEVICE

BACKGROUND OF THE INVENTION

1. Field of the Invention

The present invention relates to a ball screw device comprising a ball screw nut and a tube attached on the outer side of said nut for returning plurality of balls, said balls being rotatingly movable between the spiral groove provided on the inner periphery of said screw nut and the spiral groove provided on the outer periphery of the screw shaft. More particularly, the structure of the present invention device reduces the noise caused by balls colliding with the tube and enables easy production, attachment to the nut and handling of the tube.

DISCUSSION OF THE BACKGROUND

It is well known that in the ball screw device of this type, the screw nut and the screw shaft of a ball screw device are caused to move spirally and relative to each other about the axial center while causing a plurality of balls to circulate in between the spiral groove provided on the inner periphery of the screw nut and the spiral groove provided on the outer periphery of the screw shaft. As both ends of the spiral groove of the nut where the balls roll are communicated with each other by means of a separate tube for returning the balls, the balls can be picked up at one end of said tube and returned from the other end of said spiral groove via the tube. Generally, said tube for returning the balls is made of metal and thus causes much noise and vibration when the device is in operation as steel balls collide with one another or as the steel balls clash against the metal tube, particularly at the portion where the balls are picked up.

In the prior art ball screw device provided with a tube for returning the balls, there is provided a means for reducing the noise transmitted from this ball returning tube as shown in FIGS. 5 and 6. A low friction, non-metallic material 11 is coated on the inner face of the metal tube portion 10a of the ball returning tube 10, so as to prevent direct clashing of the balls against the metal tube and to facilitate rolling of the balls 12 inside the tube 10 (see Japanese Utility Model Application Laid-open No. 107861/1990). There is also disclosed a buffer structure wherein the ball returning tube is coated on its outer periphery with a resinous buffer material, (see Japanese Utility Model Application Laid-open No. 115660/1988).

Use of a non-metallic, low friction material or a resinous buffer material for coating the ball returning tube may be effective to a certain extent in reducing the noise caused by the rolling balls. However, it involves too much trouble and cost to apply a uniform coating of such material either on the inner or outer periphery of the tube. According to said UM Specification Laid-open No. 107861/1990, the metal portion constituting the tube is divided into two halves along the axial line of the tube, and after the low friction material is applied on the inner periphery of the halves, they are put together back into a tube and inserted and fixed in the hole provided in the nut. Because the tube is divided into two halves, its strength as a whole is reduced and assembling of the ball screw device becomes complicated. The metal tube also becomes easily displaced at the portion where the two halves are joined, increasing the risk of noise being generated.

SUMMARY OF THE INVENTION

It is therefore an object of the present invention to provide a ball screw device whose ball returning tube is less likely to cause noise and which can be easily manufactured.

Another object of the present invention is to provide a ball screw device whose ball returning tube, even when divided into two halves to facilitate bending process, can be easily put back into a tube maintain its strength when assembled, and can have reduced noise and vibrations.

These and other objects of the present invention can be achieved by a ball screw device comprising a ball screw shaft which is provided with a spiral groove on its outer periphery, a ball screw nut which receives said screw shaft, the screw nut being provided with a spiral groove on its inner periphery and having a pair of holes that open into the spiral groove and extend toward the outside of the nut to receive a tube therein, and a ball returning tube which is coated with a heat shrinkable resin on its outer periphery wherein both ends of the tube are inserted in said hole for the tube provided in the screw nut, said spiral grooves, constituting a passage within which the balls roll, and a plurality of balls which rotatingly move and circulate in the passage and the tube.

According to one embodiment of the present invention, the ball returning tube of the ball screw device comprises a metal tube which is divided into two halves along its axial line and a heat shrinkable resin which is coated on the outer periphery of said metal tube to integrally hold the metal tube.

The ball returning tube according to the present invention can be obtained by covering a metal tube with a heat shrinkable resin tube of a diameter slightly larger than the metal tube and then heating the assembly, so that the resin becomes shrunk and snuggly fits over the metal tube to cover its entire outer surface. When the ball screw device is assembled by inserting said ball returning tube in the hole of the nut for receiving the tube, the noise and vibration caused by the balls rolling at a high speed and upon clashing against the tube can be absorbed by said resin, significantly reducing the noise, etc. By putting back the two divided halves into one integral metal tube, and covering and heating the entire outer surface with a heat shrinkable resin, the metal tube can be readily assembled as one integral member. Because the divided halves of the metal tube are originally not tubular, press machining and bending of the tube to curve it from its end where the balls are picked up and to the other end where the balls are fed can be accurately and easily achieved.

BRIEF DESCRIPTION OF THE DRAWINGS

The foregoing and other objects, features and advantages of the invention will be apparent from the following more particular description of the preferred embodiments of the invention illustrated in the drawings, wherein.

DESCRIPTION OF THE PREFERRED EMBODIMENTS

Figure 1:
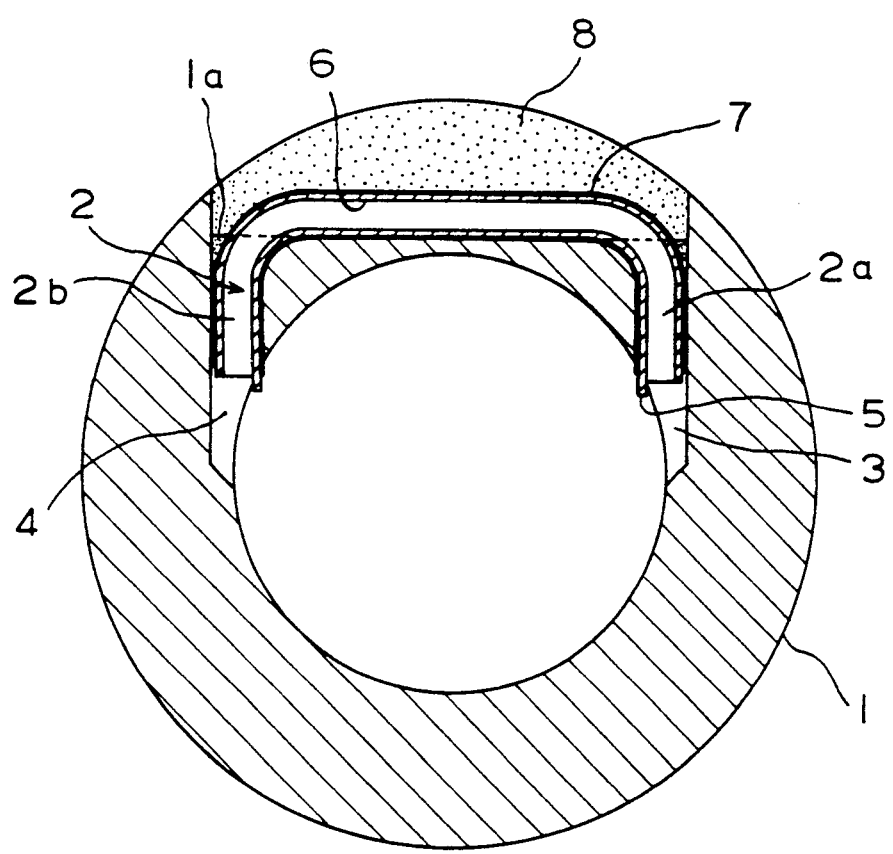
FIG. 1 is a cross sectional view of the ball screw nut of the ball screw device according to one embodiment of the present invention.

Referring now to FIG. 1, there is shown a ball screw nut attached with a ball returning tube. According to this embodiment, a portion of its outer periphery is cut out to form a flat plane. A substantially U-shaped tube 2 for returning the balls is disposed in a substantially diagonal arrangement on the cut out plane 1a. Both ends 2a, 2b of the ball returning tube 2 are so inserted in the holes 3, 4 provided in the cut out plane 1a of the nut 1 that the inner hole of the tube can be communicated with the spiral groove made on the inner periphery of the nut 1. A lip 5 each for picking up the balls is formed on both ends of the ball returning tube 2. The ball returning tube 2 as shown in FIG. 1 is formed by covering a metal tube 6 entirely with another tube 7 made of heat shrinkable resin and heating the thus assembled tube. The resin tube 7 becomes closely fitted over the metal tube 6 by heating. The ball returning tube 2 of this construction is inserted in the holes 3, 4 of the screw nut 1 and then buried using a filling material 8 such as metal bond to prevent the tube 2 disposed on the cut out plane 1a of the nut 1 from becoming exposed. Alternatively, the tube can be fixed using a tube fixing member. The resin tube 7 provided on the outer periphery of the metal tube absorbs the vibration caused when the balls (not shown) roll inside the tube 2 to thereby reduce the noise. A heat shrinkable resin tube having a diameter slightly larger than that of the metal tube 6 may be fitted over a plurality of metal tubes 6 and heated to achieve strong bonding of the resin tube with the metal tube.

Figure 4:
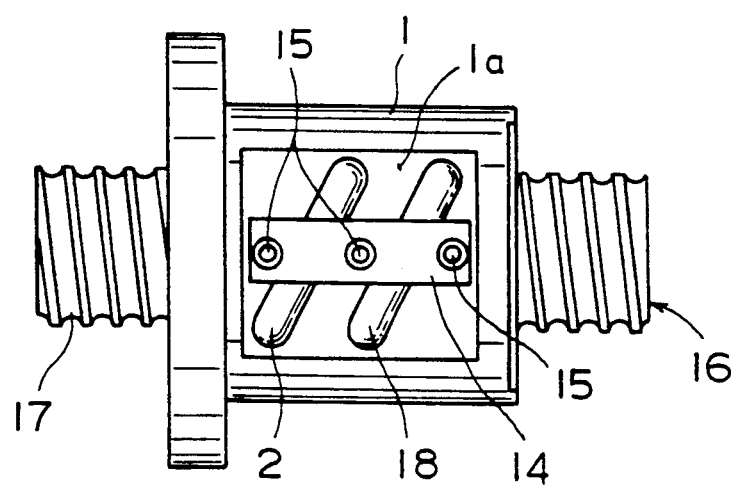
FIG. 4 is a plan view to show the ball screw device according to still another embodiment when viewed from the side of the member for pressing the tube.
Figure 5:
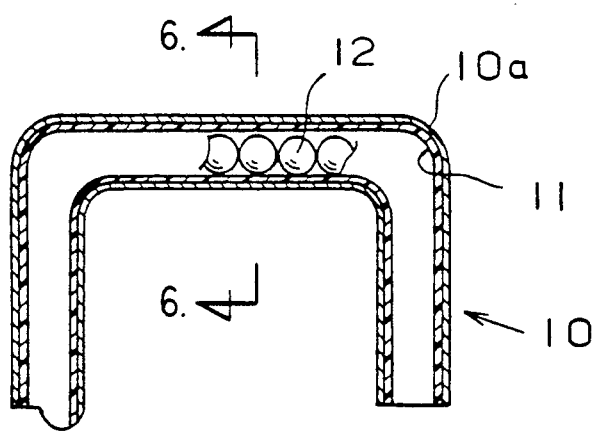
FIG. 5 is a vertical sectional view to show the ball returning tube according to the prior art.
Figure 6:
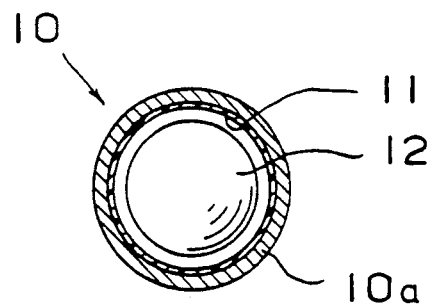
FIG. 6 is an enlarged sectional view of FIG. 5 taken along line VI—VI.

According to the embodiment shown in FIG. 4, two ball returning tubes 2, 18 are disposed on the flat cut out plane 1a provided on the outer periphery of the ball screw out 1. These ball returning tubes 2, 18 are pressed against the cut out plane 1a by means of a member 14 for this purpose and are held fixed by means of anchor screws 15. Two ball returning tubes 2, 18 are respectively communicated with a passage where the balls rotatingly move and which is formed between the spiral groove on the inner periphery of the nut 1 and the spiral groove 17 on the outer periphery of the screw shaft 16.

Figure 2A:
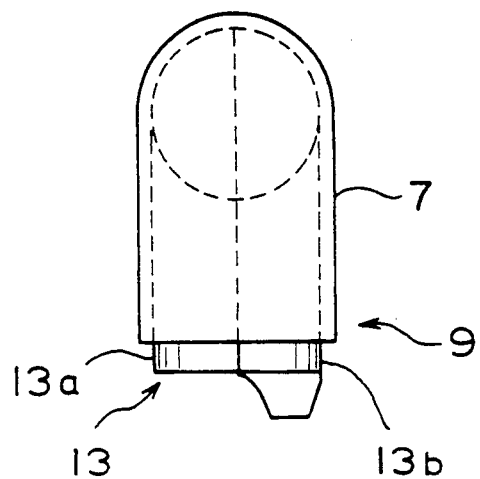
FIG. 2A is a front view of the splittable ball returning tube of the ball screw device according to another embodiment of the present invention.
Figure 2B:
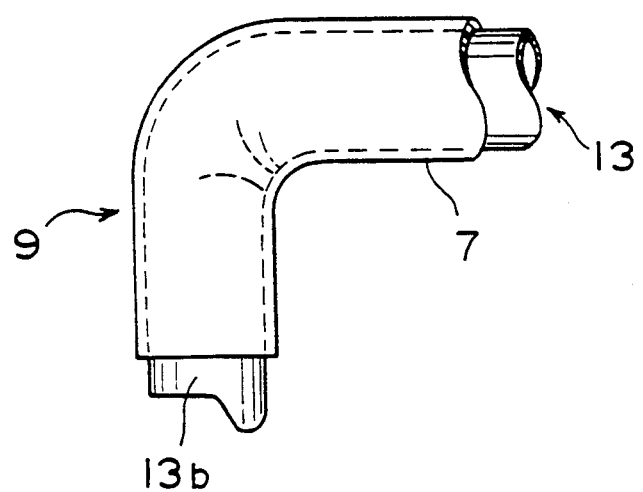
FIG. 2B is a partial side view of the splittable ball returning tube shown in FIG. 2A.

FIGS. 2A and 2B are front and partial side views of the splittable ball returning tube 9 according to another embodiment of the invention. According to this embodiment, the substantially U-shaped metal tube constituting the tube can be split into two halves along its axial center line. The two halves 13a, 13b are put back together and then covered with a heat shrinkable resin tube 7. The entire assembly is heated to cause the resin tube 7 to shrink, so that it can tightly hold the two halves 13a, 13b of the metal tube together as one integral member. Upon the ball returning tube is inserted in the holes provided on the screw nut for receiving the tube and the entire outer surface is covered with a filling material. Alternatively, a pressing member or the like for the tube is used to fix the tube to the ball screw nut in the same manner as described with respect to the embodiment shown in FIG. 1.

Figure 3:
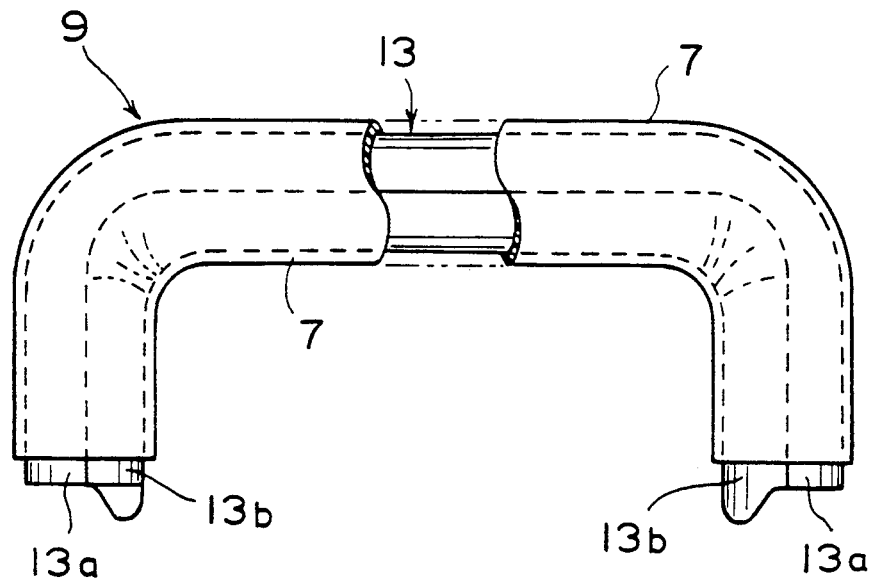
FIG. 3 is a partially cut side view to show a variation of the splittable ball returning tube according to the invention.

The direction of splitting the metal tube 13 into two halves is not limited to vertical splitting such as shown in FIGS. 2A and 2B and, instead, it can be split along the axis of the tube in the horizontal direction, as shown in FIG. 3.

As has been described in the foregoing, covering the outer periphery of the ball returning tube made of metal with a resin tube prevents propagation of impact, vibration or noise caused by the balls rolling at a high speed inside the tube or by the balls clashing against the metal tube as the resin tube on the outer periphery absorbs them. Application of the resin on the outer periphery of the metal tube is readily possible as it suffices to fit the heat shrinkable resin tube over the metal tube.

In the case of a splittable tube such as shown in FIGS. 2A and 2B, the construction is effective not only because vibration and noise can be readily absorbed by the resin material but because manufacturing and assembling of the ball returning tube becomes very simple and easy without affecting the strength of the tube. Generally, it is difficult to bend a metal pipe into a U-shape while accurately maintaining its inner diameter uniform. However, when the tube is split into two halves along the axial line, it becomes possible to manufacture the same by using a metal sheet and concurrently press molding the metal sheet into a substantially U-shape and curving the same into a semi-circle to form the inner hole of the tube with accuracy. Moreover, with the splittable tube according to the invention, the split halves are put back together into a tube, tentatively held together by a heat shrinkable resin tube and then heated to assemble the same as one integral member, contributing to increased strength as compared with the prior art split tube. Efficiency in attaching the tube to the ball screw can also be improved. Still further, the present invention is advantageous in that the resin tube covering the outer periphery of the tube protects the inside surface of the metal tube from local dents or scars caused by external impacts of other objects, and prevents corrosion thereof, providing a ball screw device having a ball returning tube which is easy in handling.

Obviously, numerous modifications and variations of the present invention are possible in light of the above teachings. It is therefore to be understood that within the scope of the appended claims, the invention may be practiced otherwise than as specifically described herein.

What is claimed is:

1. A ball screw device, comprising:
   a ball screw shaft formed within a spiral groove on its outer periphery, a ball screw nut which envelopes said ball screw shaft and is formed with a spiral groove on its inner periphery and further with a pair of holes that open into said spiral grooves,
   a ball returning tube which is covered with a heat shrinkable resin on its outer periphery and which has opposite ends thereof inserted in said holes formed in said screw nut wherein a passage is defined by said spiral grooves, and
   a plurality of balls which rotatingly move and circulate in said passage and said ball returning tube.

2. The ball screw device as claimed in claim 1 wherein said ball returning tube comprises a substantially U-shaped metal tube and a heat shrinkable resin coating on the outer periphery of the metal tube.

3. The ball screw device as claimed in claim 1 wherein said ball returning tube comprises a substantially U-shaped metal tube and a heat shrinkable resin coating on the outer periphery of the metal tube, the metal tube.

4. The ball screw device as claimed in any one of claims 1 through 3 which comprises a pressing member for fixing said ball returning tube on an outer side of the ball screw nut.

5. The ball screw device as claimed in any one of claims 1 through 3 wherein a portion of said ball screw nut forms a flat plane, said holes for receiving the tube are formed in said flat plane, and a mold resin is filled in the flat plane for burying and fixing the ball returning tube on the flat plane.

* * * * *